United States Patent [19]

Jaeger

[11] 4,075,376
[45] Feb. 21, 1978

[54] BOILER TUBE COATING AND METHOD FOR APPLYING THE SAME

[75] Inventor: Frederick T. Jaeger, Rosemere, Canada

[73] Assignee: Eutectic Corporation, Flushing, N.Y.

[21] Appl. No.: 672,785

[22] Filed: Apr. 1, 1976

Related U.S. Application Data

[63] Continuation-in-part of Ser. No. 567,091, April 11, 1975, abandoned.

[51] Int. Cl.² .................................. F16L 59/00
[52] U.S. Cl. ......................... 428/36; 29/157.4; 138/145; 427/34; 427/190; 427/191; 427/236; 427/318; 427/319; 427/327; 427/328; 427/421; 427/423; 428/457; 428/469; 428/472
[58] Field of Search ............... 427/236, 34, 190, 191, 427/318, 319, 421, 423, 327, 328; 428/36, 472, 457, 469; 138/145; 29/157.4

[56] References Cited

U.S. PATENT DOCUMENTS

| | | | |
|---|---|---|---|
| 3,150,938 | 9/1964 | Pelton et al. | 427/34 |
| 3,326,714 | 6/1967 | Rath | 427/34 |
| 3,378,392 | 4/1968 | Longo | 427/34 |
| 3,455,019 | 7/1969 | Quass | 427/34 |
| 3,556,747 | 1/1971 | Hyck et al. | 427/34 |
| 3,719,519 | 3/1973 | Perugini | 427/34 |

*Primary Examiner*—Ronald H. Smith
*Assistant Examiner*—Joyce A. Bell
*Attorney, Agent, or Firm*—Hopgood, Calimafde, Kalil, Blaustein and Lieberman

[57] ABSTRACT

A boiler tube coating and method are disclosed in which industrial steel tubes or pipes, for example, steel boiler tubes and/or integrated panels of steel boiler tubes, are provided with a fused overlay of a corrosion and erosion resistant coating comprised of a refractory hard component, e.g. tungsten carbide, dispersed through a corrosion resistant matrix alloy.

8 Claims, 6 Drawing Figures

U.S. Patent  Feb. 21, 1978  Sheet 1 of 2  4,075,376
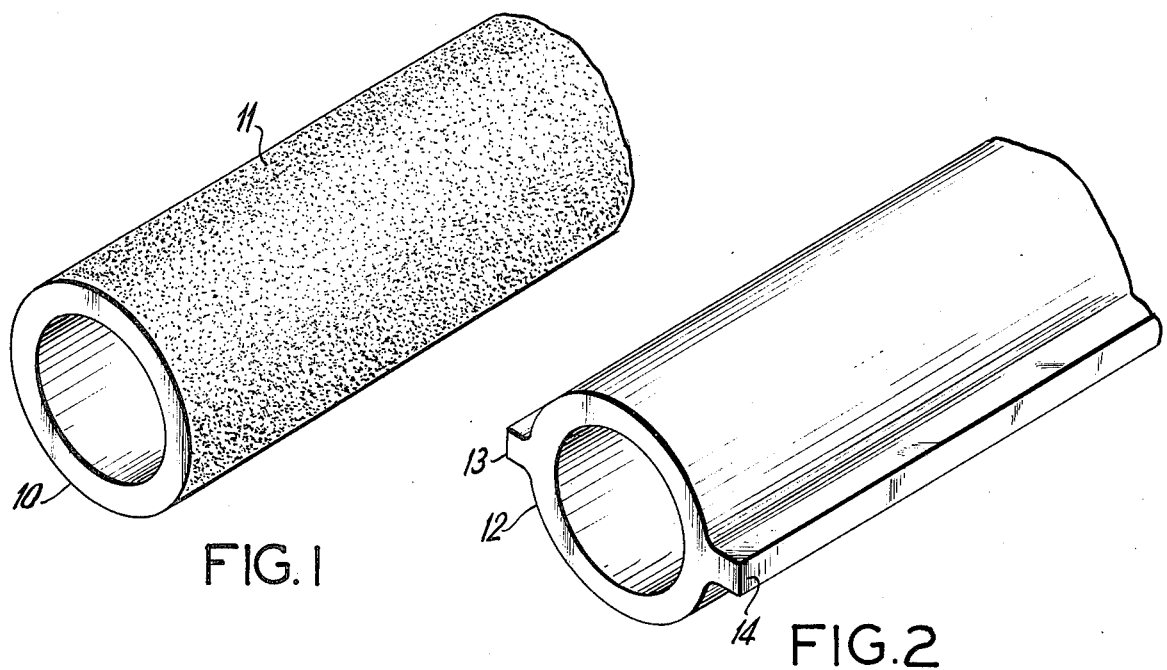
FIG.1
FIG.2
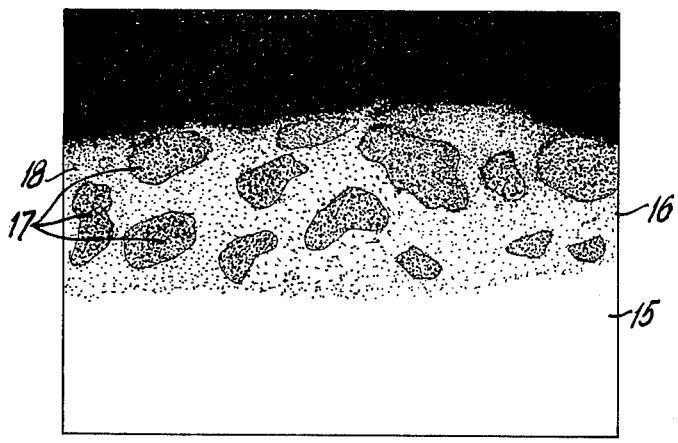
FIG.3
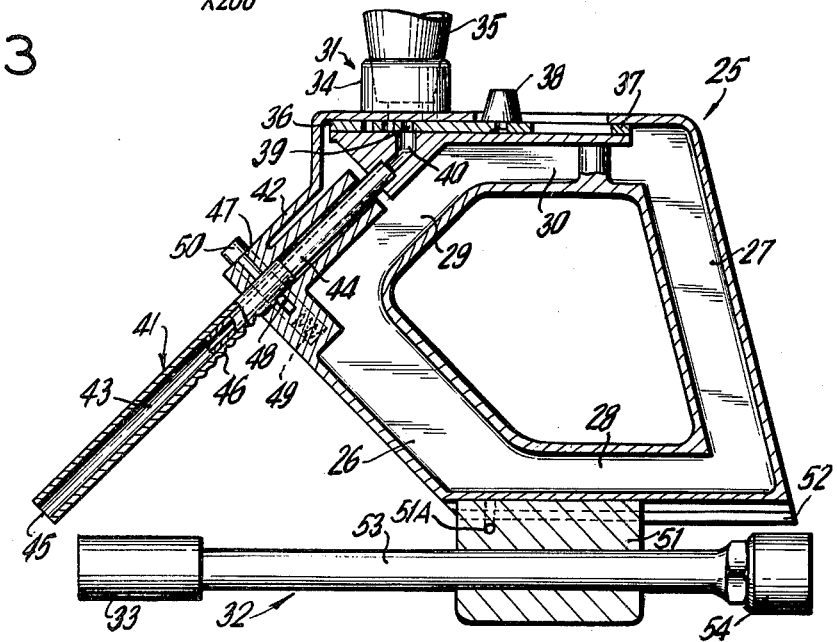
FIG.6

BOILER TUBE COATING AND METHOD FOR APPLYING THE SAME

This application is a continuation-in-part of Ser. No. 567,091, filed Apr. 11, 1975 now abandoned.

This invention relates to alloy coated boiler tubes and to a method for coating boiler tubes to extend the wear and service life thereof, the alloy coating being characterized by resistance to heat, wear and erosion.

STATE OF THE ART

It is well known in the prior art that boiler tubes generally have a relatively short life due to corrosion and erosion problems which exist in high temperature boilers. The high boiler temperatures together with the flow of hot gases carrying particles, soot and other wear and erosion-causing materials generally result in aggravated wear through the tube walls. Complete tube stacks or panels have been known to require replacement in a matter of months.

In one important application, boiler tubes are employed in the fabrication of "skirts" for use in the steel-making process known as the "Basic Oxygen Process." The skirts comprise a series of boiler tubes butt-welded end-to-end and cold formed into the shape of coil. The shape is retained by several steel brackets welded on the outside of the coil. The coil is fitted with couplings so steam or water may be pumped through the system.

In producing a molten steel heat in the Basic Oxygen Process, oxygen is blown into the metal bath in the converter under a hood to oxidize out impurities which are taken up by the slag. The action is rather volcanic in that molten slag and metal splash everywhere within the hood at temperatures of 3000° F and above. The skirt is used as a cooling coil between the hood and the converter and is subjected to heat cycles and the oxygen blow. Steam or water is pumped through the skirt tubes to keep it cool, the circulation temperatures being below 700° F. Because the skirt coils are exposed directly to the heat cycle, excessive wear occurs by at least one of the following: (1) abrasion from slag and metal particles blown against the tubes; (2) corrosion resulting from alternate oxidation and reducing atmospheres; (3) from solution of molten slag hang-up on the surfaces of the tubes; (4) erosion due to high turbulent flow of gas during the oxygen blow; and (5) stresses which cause the flaking off of oxide scale due to expansion and contraction of the tubes during the heating cycle.

An object of this invention is to avoid and overcome the defects and deficiencies of the prior art practices by providing an alloy and method for coating boiler tubes to extend the useful life thereof and also to provide, as an article of manufacture, a coated tube or integrated boiler tube stack or panel characterized by improved resistance to corrosion, erosion and wear.

Considerable research has been conducted in an effort to overcome or inhibit boiler wear and erosion. After experimentation involving a variety of approaches, it was discovered that unexpectedly improved results in the form of extended boiler tube life can be achieved by overlay coating boiler tube external wall surfaces with certain alloys. It was found that, for best results, these alloy overlays for boiler tubes may be of the type that characteristically are capable of being fused to eliminate voids and porosity. It was further discovered that the life of the boiler tube can be further extended by the inclusion in the overlaid surface wear resistant components, such as tungsten carbide or other refractory carbides.

Other objects of the invention will clearly appear when taken in conjunction with the following disclosure and the accompanying drawings, wherein:

FIGS. 1 and 2 are illustrative of certain boiler tubes that may be coated in accordance with the invention;

FIG. 3 is representative of a photomicrograph at 200 times magnification showing in cross section the characteristics of the boiler tube coating;

FIG. 6 depicts one type of spray torch for use in carrying out the invention.

DETAILS OF THE INVENTION

Figure 4:
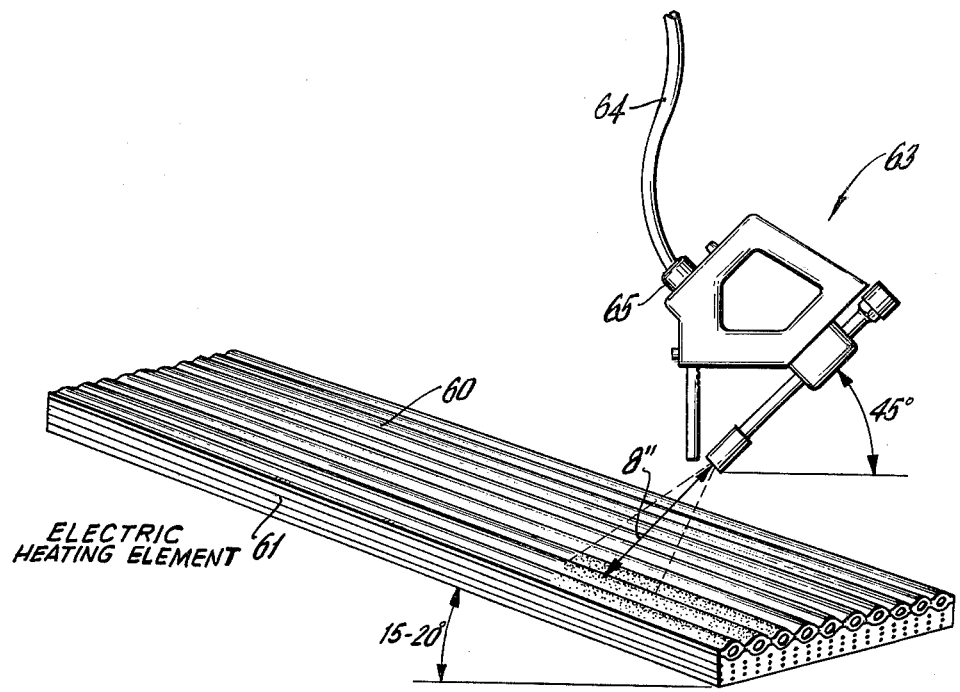
FIGS. 4 and 5 illustrate one method for coating an integrated panel of boiler tubes joined adjacently together via welded longitudinal fins on each tube.

A number of alloy overlay systems, with good wear and impact resistant properties at high temperature conditions, are suitable overlays within the teachings of the present invention. An example of one such overlay alloy system is as follows.

A heterogeneous powder comprising 40% to 60% by weight of a powder refractory hard component and comprising 60% to 40% by weight of a matrix alloy is preferred. The refractory hard component may range from as low as 10% to as high as 70% by weight and the matrix alloy from about 90% to 30% by weight.

The matrix alloy can, as an example, consist essentially of NiCrSiB, NiSiB, NiCuB and CoCrW alloy systems as exemplified below:

| Element | Weight Percent | | | |
|---|---|---|---|---|
| | NiCrSiB | NiSiB | NiCuB | CoCrWB |
| C | 0.5/1.10 | 0.01/0.1 | 0.2 max. | 0.6/3.0 |
| Si | 3.0/6.0 | 2.0/5.0 | 2.0/6.0 | 0.3/2.0 |
| B | 3.0/4.0 | 1.0/3.0 | 0.5/2.0 | 3.0 max. |
| Cr | 6.0/28.0 | — | 1.0 max | 20.0/35.0 |
| W | — | — | — | 4.0/14.0 |
| Fe | 5.0 max. | 2.0 max. | 1.5 max. | 3.0 max. |
| Ni | Balance | Balance | Balance | 5.0 max. |
| Co | — | — | — | Balance |
| Cu | — | — | 20.0/40.0 | — |

The foregoing alloys are formulated to provide melting points ranging up to about 2500° F (1371° C). Broadly speaking, the matrix may be selected from the group consisting of nickel-base, nickel-copper-base, iron-base and cobalt-base alloys containing at least one element selected from the group consisting of 0.5% to 6% silicon and 0.5% to 5% boron having melting points ranging up to about 2500° F (1371° C).

The refractory hard component may comprise the following materials and/or mixtures thereof:

Carbides of tungsten, silicon, vanadium, titanium, boron, chromium, molybdenum and chromium. Nitrides of silicon, boron and titanium, borides of chromium, tungsten, molybdenum, tantalum and vanadium. Silicides of boron, molybdenum and columbium.

An example of a preferred embodiment of this invention is 50% by weight of a NiCrSiB matrix alloy and 50% by weight of tungsten carbide. Another preferred embodiment is 60% by weight matrix metal and 40% by weight of tungsten carbide.

The alloy overlay can be applied on the boiler tube surface with several application methods well known in the art, that are capable of fusing the alloy overlay on the contour of the boiler tube surface. It was found that a nonfused overlay with voids will not provide the superior extended tube life results desired. Examples of well suited application methods are the two-step process of flame spraying and subsequent fusing of the overlay alloy or the process of simultaneous spraying and fusing the overlay alloy.

The overlay alloy can be in the form of a heterogeneous mixture of alloy metal powder particles and refractory hard powder particles. The alloy metal powder particles can be of a mesh size ranging from less than 125 mesh (minus 125 microns) to about 400 mesh size (about 40 microns). The refractory hard powder particles can be of a mesh size ranging from about 120 mesh (about 125 microns) to 300 mesh (about 50 microns) or broadly from 5 microns to 125 microns. Mesh size referred to herein is based on U.S. Standard. It will be understood by those skilled in the art that the boiler tubes can be coated in accordance with the teachings of this invention either singly or in integrated tube stacks. The objects of this invention have been achieved by the provision of a method for appreciably extending the life of boiler tubes.

The coating is produced upon the surface of the boiler tubes by flame spraying utilizing flame spray torches of the type illustrated in U.S. Pat. Nos. 3,226,028, 3,262,644, 3,273,800 and especially a spray torch of the gravity feed type disclosed in U.S. Pat. No. 3,620,454. The spray torch of the latter patent is particularly useful where the powder is first sprayed onto the tube substrate followed by fusion. The torches disclosed in the first three patents may be used for simultaneously spraying and fusing the coating.

The coating is applied to the preheated boiler tubes or integrated tube panels by flame spraying and the coating thereafter subjected to the flame of an oxy-acetylene torch to fuse and coalesce the coating on the tube substrate. Alternatively, the coating can be fused by passing the coated article through a gas-fired fusion furnace. The boiler tube steel may comprise mild steel, rimmed steel, low silicon steel, and the like. Boiler tube steels are well known in the art and are disclosed in the literature. In this connection, reference is made to Vol. 1 of the ASM Metals Handbook, Eighth Edition (1961), page 264.

Tests conducted on coatings of about 0.01 inch exhibited an increased life of at least about four times of unprotected tubes. Large savings in downtime and maintenance costs were indicated. The coating thickness may range from about 0.005 to 0.07 inch thick, such as 0.01 to 0.035 inch, preferably from about 0.01 to 0.02 inch. The coating comprises a corrosion resistance matrix alloy having dispersed therein particles of hard refractory material, such as tungsten carbide.

A section of a boiler tube 10 is shown in FIG. 1 covered with a fused coating 11 of a self-fluxing nickel-base matrix alloy containing particles of cast tungsten carbide, the amount of cast tungsten carbide being about 60% by weight dispersed through 40% by weight of the matrix alloy. The matrix alloy in this instance contains by weight 7% Cr, 4.5% Si, 2.9% B, 3% Fe and the balance essentially nickel.

Referring to FIG. 2, a boiler tube 12 is shown in a grit-blasted condition in preparation for spray coating, the tube having diametrically opposite side fins or wings 13, 14 by means of which integrated tube panels are produced by abutting an array of boiler tubes 12 along their respective fins in side-by-side relationship and welding the array together to produce a rigid tube panel from which skirts may be produced for use in the equipment employed in the basic oxygen steelmaking process.

A typical boiler tube coating produced in accordance with the invention is shown in the representation of a photomicrograph taken at 200 times magnification illustrated in FIG. 3, the boiler tube substrate being designated by the numeral 15, the coating designated by the numeral 16, the coating comprising grains of tungsten carbide 17 of about 25 to 75 microns in average size dispersed through the aforementioned nickel-base alloy 18.

The flame spray may be employed on a variety of boiler tubes. The term "boiler tubes" is used in the broad sense to include industrial steel tubes or pipes for boilers, heat-exchangers, recovery systems, cooling systems and other systems in which the surfaces of the tubes are subjected to corrosive and/or errosive environments at room and elevated temperatures. The process lends itself to automation, especially in the coating of boiler tubes integrated together as a tube panel. A typical boiler tube size, by way of example, is one having an O.D. of about 1.5 inches, an I.D. of about one and one-sixteenth of an inch (1.08 inches to 1.09 inches), a wall thickness of about 0.20 to 0.21 inch and lengths of upwards of about 32 feet.

In cleaning the tubes by grit blasting, coarse plus 25 mesh chilled cast iron grit is preferably employed. However, other grit-blasting techniques may be employed. The tubes are aligned with the side fins touching and the tubes welded together along the fins by submerged arc welding. Submerged arc welding is well known and is disclosed in Vol. 6 of the Metals Handbook, Eighth Edition (1971), pages 46 to 77. This technique produces a good sound integrated tube panel for use in the production of a skirt as described hereinbefore.

Figure 5:
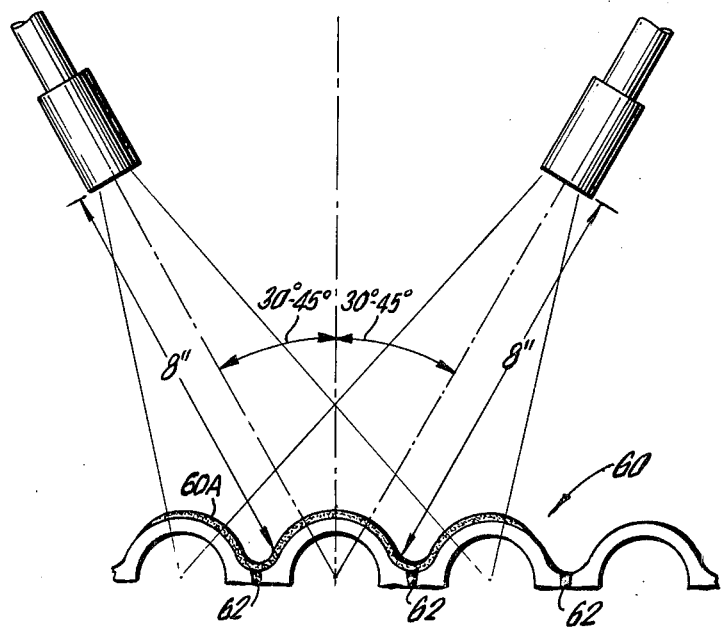

In this connection, reference is made to FIGS. 4 and 5 which illustrate one method of spray coating boiler tube panels.

As illustrative of the various embodiments of the invention, the following examples are given:

EXAMPLE 1

A mild steel boiler tube is placed in a turning device and blasted with plus 25 mesh (U.S. Standard), chilled cast iron grit while the tube is turning at about 100 rpm. The tube is thereafter dry air-blasted to remove any mill dust. The tube is one and one-half inch in outside diameter, has a wall thickness of about 0.20 to 0.21 inch and a length of upwards of 32 feet.

One end of the tube is then gripped in a drive end chuck with the other end supported by an idler and turned at a speed of about 100 rpm. The tube is first preheated and then sprayed with a powder composition using a spray torch of the type illustrated in FIG. 6. The powder is a mixture comprising 60% by weight tungsten carbide of about 37 to 105 microns in size and 40% matrix metal alloyy by weight of about 10% maximum plus 140 mesh, about 35% to 55% minus 325 mesh and the balance plus 325 mesh. The matrix metal contains by weight about 7% Cr, 4.5% Si, 2.9% B, 6% Fe and the balance essentially nickel.

After preheating the tube to about 400° to 550° F, the mixture is sprayed using the torch illustrated in FIG. 6 and described in U.S. Pat. No. 3,620,454. This torch is also shown for spraying tube panels in FIG. 4. The flame spray torch 25 shown may be adapted for gravity feed of metal powder directly to the flame issuing from the nozzle as shown, or the powder feed may be automated by injection with a carrier gas under pressure (e.g., such as argon) from a powder feed unit.

The torch has a housing in the shape of a five-sided polygon with one leg of the polygon arranged as a handle portion 27, another leg as a base portion 28, a further leg as a feed portion 29, and another leg of the polygon as the top portion of the torch. The housing 26 has coupled to it a powder feed assembly 31 and a flame assembly 32 to which is coupled nozzle 33.

The top portion 30 is provided with a fitting 34 adapted to receive a receptacle 35 (shown fragmentarily) for holding the alloy powder, a metering device being employed to control powder feed comprising a feed actuator plate 36 slidably mounted in a slot 37 located in the housing top portion 30 below fitting 34. Feed plate 36 is provided with a knob 38 which protrudes upwardly above the housing and permits the sliding of feed plate 36 reciprocally toward and away from housing feed portion 29.

The powder flows by gravity unhindered through circular orifices which may range in size from 0.075 to 0.120 inch for different alloy powders, the flow being maintained substantially constant over a mesh size range of minus 50 to plus 300 mesh.

In achieving the desired flow rate, feed plate 36 is selectively aligned with powder flow orifice 39 to control variably the flow rate of the powder from receptacle 35 through flow orifice 39 through conduit 40 and through variable spray control assembly 41. Assembly 41 has a housing 42 which holds a powder feed tube 43 and having a central core hollow cylinder 44 slidably and telescopically fitted within feed tube 43 and communicating directly with powder flow conduit 40 to deliver powder directly by gravity to feed tube 43 through discharge end 45. A portion of the outer surface of feed tube 43 is provided with indexing means or grooves 46 which through latching assembly 47 enables the setting of powder feed tube 43 in order to locate discharge end 45 at the correct distance from the flame end of nozzle 33. The latching assembly comprises a holding pin 48 that is normally urged toward one of the indexing grooves 46 by spring 49, the holding pin 48 being actuated by rod 50 in making the setting. Thus, by depressing rod 50, the pin is moved out of contact with one of the indexing grooves and tube 43 set according to the desired position.

The flame assembly 32 is supported by sliding element 51 which can be lockingly moved along a track 52 located at the bottom leg of housing 26, a locking pin 51A being provided as shown. Gas flow tube 53 is fixedly held by sliding element 51 and may be factory set, one end of the tube having a connector 54 for attaching to a source of oxygen and acetylene.

The powder flows down tube 43 and is discharged at 45 into the flame issuing from nozzle 33.

The powder is sprayed on the aforementioned tube at about one-quarter pound per foot of tube (about one-half hour per 30 foot tube). About 7.5 pounds of powder are consumed per tube. The spray torch is preferably mounted on a carriage which is caused to move in the direction of the tube at about one foot per minute. The tube is spray-coated to a thickness of about 0.016 inch to allow for shrinkage after fusing to a thickness of approximately 0.01 inch.

Using the same carriage, the torch of FIG. 6 is replaced by a high temperature fusion torch, such as an oxyacetylene torch. In fusing the spray coating, the fusion torch is adjusted so that the tip is directed at a 45° angle to the direction of travel of the carriage and about one inch away from the tube. The turning speed of the tube is reduced to 80 rpm and the carriage travel to 3 minutes per foot. The fusion process may be speeded up by using two carriages, each with a fusion torch. The spray coating is heated to above the fusion point and then allowed to cool until the red glow disappears (below 1000° F). Thereafter, the tube is transferred by means of a hoist to a cooling rack. The coating thickness shrinks from an as-sprayed thickness of about 0.016 to about 0.01 due to reduction in porosity. The completed tube is then used with other coated tubes to produce the skirt referred to herein, certain finishing operations being applied to the tube.

EXAMPLE 2

A tube panel is produced using 1-½ diameter (O.D.) boiler tubes of the type shown in FIG. 2. Ten foot tubes are aligned fin-to-fin in side-by-side relationship to produce a tube panel 5 ft wide and 10 ft long, the tubes being submerged arc welded together along their mutually contacting fins to produce the integrated panel shown in FIGS. 4 and 5. The panel is grit blasted and the residual dust and grit blown off. Referring to FIG. 4, the panel 60 is supported along its length at a slight angle of about 15° to 20° to the horizontal and heated by heating elements 61 and the panel preheated to about 300° F to 550° F. A partial cross section of the tube panel is shown in FIG. 5 welded together at their fin portions as evidenced by weldments 62 between each of the tubes. In FIG. 4, a spray gun 63 is shown of the type depicted in more detail in FIG. 6.

As will be noted, a flexible powder feed tube 64 is coupled to a powder feed fitting 65, the powder being gravimetrically fed from a powder-containing module not shown coupled to the flexible tube.

The torch is directed at a 45° angle to the panel. Preferably, a carriage is employed (not shown) mounted on a track above the panel adapted to travel the full length of the panel with two torches oriented at opposed 30° to 45° angles as shown in FIG. 5 with the nozzles thereof about 8 inches from the tube surface. Predetermined groups of tubes are sprayed with the composition employed in Example 1 until the entire panel has been spray coated to form coating 60A. A travel speed of about 8 inches to 3 feet per minute may be employed. The thickness of the spray coat is at least sufficient to provide a final coating thickness after fusion of at least 0.01 inch. The powder mixture sprayed is the same as that disclosed in Example 1.

Upon completion of the spraying, the panel is transferred to a table in front of a propane fired or other gas-fired furnace ready for fusing. The furnace is capable of providing a temperature of about 2500° F. The panel is then passed completely through the heated furnace on supports. After fusion of the coating is completed, the panel is transferred to a cooling bed. The panel is then cleaned, subjected to finishing operations and fabricated into a skirt coil.

Generally speaking, the tubes of Example 1 and the panel of Example 2 are inspected and touched up with spray powder, where necessary, following inspection by using spray techniques disclosed in U.S. Pat. Nos. 3,190,560, 3,226,028 and 3,262,644, and the like.

In addition to the nickel-base matrix alloy disclosed above, copper and cobalt-containing matrix alloys may be employed together with the hard refractory component.

A copper-containing alloy is one containing by weight 27% Cu, 4% Si, 1% B, up to 1% Cr, up to 1.5% Fe and the balance essentially nickel. A cobalt-containing matrix metal is one containing by weight 1.5% C, 1.5% B, 1% Si, 4% W, 25% Cr, 30% Ni and the balance essentially cobalt. Both of these alloy powders may have mixed therewith about 10% to 70% of the refractory hard component referred to herein, generally 40% to 60% by weight, such as tungsten carbide.

In summary, the matrix alloy powder preferably ranges in size from about 125 mesh to about 400 mesh (about 125 microns to 30 microns), with the refractory hard component ranging in size from about 5 to 125 microns and preferably 50 to 125 microns (about 300 mesh to 120 mesh).

The fused coating may range in thickness from about 0.005 to 0.07 inch, preferably from about 0.01 to 0.035 inch and, more preferably, from about 0.01 to 0.02 inch. For coating thickness below 0.015 or 0.01 inch, the grain size of the hard component (e.g. tungsten carbide) should not exceed about one-half of the coating thickness.

Although the present invention has been described in conjunction with preferred emboiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of extending the life of a boiler tube subject in use to corrosion, oxidation and erosion which comprises:
    cleaning said boiler tube by grit blasting the surface thereof,
    preheating said cleaned boiler tube preparatory to receiving an alloy coating thereon, spray coating an overlay on said boiler tube of a coating composition in the form of a powder mixture consisting essentially of 10% to 70% by weight of a refractory hard powder component selected from the group consisting of carbides of W, Si, V, Ti, B, Cr and Mo; nitrides of Si, B and Ti; borides of Cr. W, Mo, Ta and V; and silicides of B, Mo and Cb blended with 90% to 30% by weight of a self-fluxing matrix alloy powder selected from the group consisting of nickel-base, nickel-copper base, iron-base and cobalt-base alloys containing by weight at least one element from the group consisting of 0.5% to 6% silicon and 0.5% to 5% boron, and thereafter fusing said overlay to the surface of said boiler tube to provide a relatively void-free bonded coating characterized by improved resistance to corrosion, oxidation and erosion.

2. A method for extending the life of a boiler tube comprising the steps of:
    cleaning said boiler tube by grit blasting the surface thereof,
    preheating said cleaned boiler tube preparatory to receiving an alloy coating thereon,
    spray coating an overlay on said boiler tube of an alloy composition in the form of a powder mixture consisting essentially of about 10% to 70% by weight of a refractory hard powder component selected from the group consisting of carbides of W, Si, V, Ti, B, Cr and Mo; nitrides of Si, B and Ti; borides of Cr, W, Mo, Ta and V; and silicides of B, Mo and Cb blended with 90% to 30% by weight of a self-fluxing matrix alloy powder selected from the group consisting of:
    a. 0.5 to 1.1% C, 3% to 6% Si, 3% to 4% B, 6% to 28% Cr, up to 5% Fe and the balance essentially nickel;
    b. 0.01% to 0.1% C, 2% to 5% Si, 1% to 3% B, up to 2% Fe and the balance essentially nickel;
    c. up to 0.2% C, 2% to 6% Si, 0.5 to 2% B, up to 1% Cr, up to 1.5% Fe, 10% to 40% Cu and the balance essentially nickel; and
    d. 0.6% to 3% C, 0.3% to 2% Si, up to 3% B, 20% to 35% Cr, 4% to 14% W, up to 3% Fe, up to 5% Ni and the balance essentially cobalt,
    and thereafter fusing said overlay to the surface of said boiler tube to provide a relatively void-free bonded coating characterized by improved resistance to corrosion, oxidation and erosion.

3. The method of claim 2, wherein the refractory hard component is tungsten carbide and ranges from about 40% to 60% by weight and the matrix alloy from about 60% to 40% by weight, wherein the size of said tungsten carbide ranges from about 5 to 125 microns, and wherein for coating thicknesses less than 0.015 inch said size does not exceed one-half of the coating thickness.

4. As an article of manufacture, a composite steel boiler tube comprising a fused protective overlay of a heat, corrosion and erosion resistant alloy consisting essentially of:
    10% to 70% by weight of powder refractory hard component selected from the group consisting of carbides of W, Si, V, Ti, B, Cr, and Mo; nitrides of Si, B and Ti; borides of Cr, W, Mo, Ta and V; and silicides of B, Mo and Cb dispersed through 90% to 30% by weight of a matrix alloy selected from the group consisting of
    a. 0.5 to 1.1% C, 3% to 6% Si, 3% to 4% B, 6% to 28% Cr, up to 5% Fe and the balance essentially nickel;
    b. 0.01% to 0.1% C, 2% to 5% Si, 1% to 3% B, up to 2% Fe and the balance essentially nickel;
    c. up to 0.2% C, 2% to 6% Si, 0.5% to 2% B, up to 1% Cr, up to 1.5% Fe, 20% to 40% Cu and the balance essentially nickel; and
    d. 0.6% to 3% C, 0.3% to 2% Si, up to 3% B, 20% to 35% Cr, 4% to 14% W, up to 3% Fe, up to 5% Ni and the balance essentially cobalt;
    said protective overlay being dense and relatively void-free.

5. The composite boiler tube of claim 4, wherein the refractory hard component in the overlay is tungsten carbide and ranges from about 40% to 60% by weight and the matrix alloy from about 60% to 40% by weight, wherein the size of said tungsten carbide ranges from about 5 to 125 microns, and wherein for coating thicknesses of less than 0.015 inch said size does not exceed one-half of said coating thickness.

6. As an article of manufacture, a composite steel boiler tube panel comprising an array of steel boiler tubes welded together in side-by-side relationship to provide an integrated panel of steel boiler tubes, said panel having fused to the surface thereof a protective overlay of heat, corrosion and erosion resistant alloy consisting essentially of:

10% to 70% by weight of powder refractory hard component selected from the group consisting of carbides of W, Si, V, Ti, B, Cr and Mo; nitrides of Si, B and Ti; borides of Cr, W, Mo, Ta and V; and silicides of B, Mo and Cb dispersed through 90% to 30% by weight of a matrix alloy selected from the group consisting of a. 0.5 to 1.1% C, 3% to 6% Si, 3% to 4% B, 6% to 28% Cr, up to 5% Fe and the balance essentially nickel;

b. 0.01% to 0.1% C, 2% to 5% Si, 1% to 3% B, up to 2% Fe and the balance essentially nickel;

c. up to 0.2% C, 2% to 6% Si, 0.5 to 2% B, up to 1% Cr, up to 1.5% Fe, 20% to 40% Cu and the balance essentially nickel; and d. 0.6% to 3% C, 0.3% to 2% Si, up to 3% B, 20% to 35% Cr, 4% to 14% W, up to 3% Fe, up to 5% Ni and the balance essentially cobalt;

said protective overlay being dense and relatively void-free.

7. The steel boiler tube panel of claim 6, wherein the refractory hard component in the overlay is tungsten carbide and ranges from about 40% to 60% by weight and the matrix alloy from about 0% to 40% by weight, wherein the size of said tungsten carbide ranges from about 5 to 125 microns, and wherein for coating thicknesses of less than 0.015 inch said size does not exceed one-half of said coating thickness.

8. As an article of manufacture, a composite steel boiler tube comprising a fused protective overlay of a heat, corrosion and erosion resistant alloy consisting essentially of:

10% to 70% by weight of powder refractory hard component selected from the group consisting of carbides of W, Si, V, Ti, B, Cr and Mo; nitrides of Si, B and Ti; borides of Cr, W, Mo, Ta and V; and silicides of B, Mo and Cb dispersed through 90% to 30% by weight of a matrix alloy selected from the group consisting of nickel-base, nickel-copper base, iron-base and cobalt-base alloys containing by weight at least one element from the group consisting of 0.5% to 6% silicon and 0.5% to 5% boron, said protective overlay being dense and relatively void-free.

* * * * *